United States Patent
Pakenham

(10) Patent No.: US 8,868,900 B2
(45) Date of Patent: Oct. 21, 2014

(54) METHOD AND SYSTEM TO LOWER POWER CONSUMPTION

(75) Inventor: Eugene Pakenham, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 13/148,012

(22) PCT Filed: Feb. 24, 2009

(86) PCT No.: PCT/US2009/035010
§ 371 (c)(1),
(2), (4) Date: Aug. 4, 2011

(87) PCT Pub. No.: WO2010/098744
PCT Pub. Date: Sep. 2, 2010

(65) Prior Publication Data
US 2011/0296162 A1  Dec. 1, 2011

(51) Int. Cl.
*G06F 1/26* (2006.01)
*G06F 1/32* (2006.01)

(52) U.S. Cl.
CPC .............. *G06F 1/3203* (2013.01); *Y02B 60/32* (2013.01); *G06F 1/3234* (2013.01)
USPC ........... 713/100; 713/300; 713/320; 713/323; 340/635; 340/644; 340/657

(58) Field of Classification Search
CPC .............. G06F 1/3203; G06F 11/1052; G06F 11/2055; G06F 11/325
USPC .......... 713/100, 300, 320, 323; 340/635, 644, 340/657
See application file for complete search history.

(56) References Cited

U.S. PATENT DOCUMENTS

| | | | |
|---|---|---|---|
| 4,675,654 A | 6/1987 | Copeland | |
| 5,859,592 A * | 1/1999 | Carlin | 340/815.45 |
| 5,938,772 A | 8/1999 | Welch | |
| 6,310,445 B1 | 10/2001 | Kashaninejad | |
| 2005/0210207 A1 | 9/2005 | Sekine et al. | |
| 2006/0038506 A1 | 2/2006 | Rose et al. | |
| 2008/0104421 A1 | 5/2008 | May et al. | |
| 2008/0265722 A1 | 10/2008 | Saliaris | |
| 2010/0164736 A1 * | 7/2010 | Byers et al. | 340/657 |

FOREIGN PATENT DOCUMENTS

| | | |
|---|---|---|
| CN | 1573658 A | 2/2005 |
| EP | 1942396 | 7/2008 |

OTHER PUBLICATIONS

JP 2003-18105—English translation;paten abstracts of Japan;1;ISR WR/OP.
JP 2003-304363—English translation ;patent abstracts of Japan ;1 ;ISR WR/OP.
International Search Report, PCT/US2009/035010, 3 pages.

* cited by examiner

*Primary Examiner* — Michael J Brown

(57) ABSTRACT

An exemplary embodiment of the present invention provides a method of lowering power consumption. The method includes temporarily disabling a plurality of status indicators on a plurality of electronic components without disabling the operation of the electronic components.

17 Claims, 6 Drawing Sheets

500

600

METHOD AND SYSTEM TO LOWER POWER CONSUMPTION

BACKGROUND

Information and service providers often use data centers to centralize network information storage. The data centers will generally have large numbers of electronic components, such as interconnected servers, switches, drive arrays, and other equipment. As a result of the large amount of equipment, the data centers use a significant amount of energy and may generate a large amount of heat that must be removed for proper operation of the equipment. Accordingly, methods and systems for lowering the power consumption in data centers would be beneficial.

Further, the large number of electronic components that may be in operation in a typical data center may make it difficult to identify specific electronic components or sub-networks that are experiencing operational problems. Thus, easier techniques for the identification of electronic components needing service or having faults may lower service costs in data centers.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The very large amount of data generated and used by businesses, such as Web service providers, among others, make it convenient to use central points for storing and distributing the information. These central points, called data centers, may include large numbers of servers, drive arrays, network switches, power supplies, and other electronic components to support the functionality. However, the large number of electronic components may use a large amount of energy and generate a substantial amount of heat.

Most of the electronic components used in a data center use light emitting diodes (LEDs) to indicate a status or event, such as communication accesses, drive access, line status, and the like. The status LEDs may also facilitate the servicing of the equipment by indicating fault conditions. Exemplary embodiments of the present invention provide for turning off the status LEDs when they are not providing value, such as after a timeout period or outside of normal working hours. This may provide for a significant reduction in the power requirements of the data center.

Further, other types of status indicators may be built into electronic components instead of or in addition to LEDs to show the status, for example, liquid crystal displays (LCDs), backlit liquid crystal displays, LCD display screens, incandescent lights, neon lights, and the like. For many of these indicators, the energy savings may be even higher than for LEDs. Accordingly, although the exemplary embodiments of the present invention discussed below may show LEDs, one of ordinary skill in the art will recognize that the methods will also apply to any of these other types of indicators.

Figure 1:
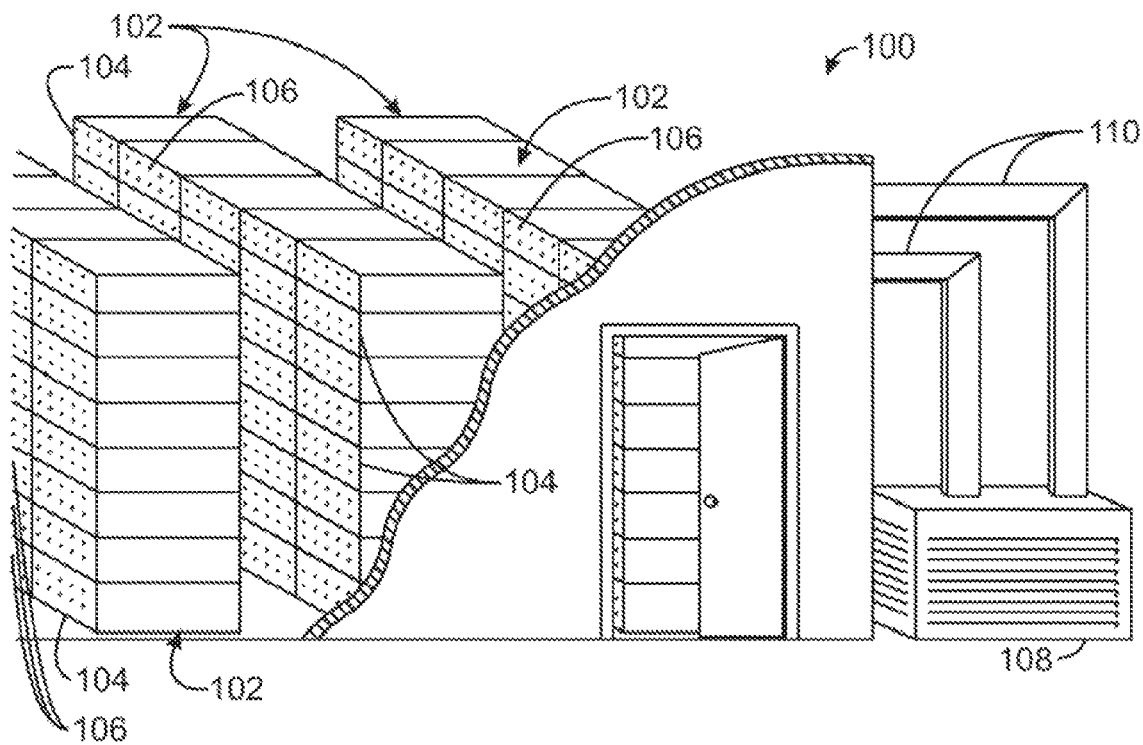
FIG. 1 is an illustration of a data center, in accordance with embodiments of the present invention.

FIG. 1 is an illustration of a data center 100, in accordance with embodiments of the present invention. In the data center 100, racks 102 hold various electronic components 104 that provide functionality for the data center 100. These electronic components 104 may include, for example, servers, switches, routers, drives, drive arrays, power supplies, or any combinations thereof. The data center 100 will typically have a cooling unit 108, which may be coupled to the data center 100 to remove heat generated by the electronic components 104 through air ducts 110.

Each of the electronic components 104 may have significant numbers of LEDs 106 configured to indicate the operation status of different parts of the electronic components 104. For example, if the electronic component 104 is a network switch, multiple LEDs 106 may be used to indicate the status of each connection between the switch and other electronic components 104.

Figure 2:
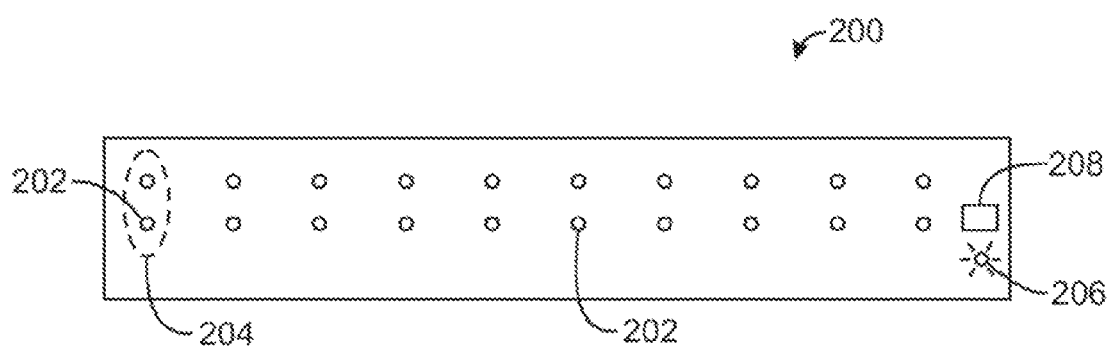
FIG. 2 is an illustration of a front panel of a server, in accordance with an embodiment of the present invention.

FIG. 2 is a in illustration of a front panel of a server 200, in accordance with an embodiment of the present invention. The server 200, which may have numerous status LEDs 202, may comprise one of the electronic components 104 illustrated in FIG. 1. The LEDs 202 on the server 200 may be used in groups such as a group 204 to indicate the status of operational units within the server. For example, groups of LEDs may be used to indicate the status of ports, drives, processors or the like. In some cases, the groups of LEDs 204 may provide more information about the server than may generally be needed under normal operating conditions. Further, the large numbers of LEDs in a typical data center may use a substantial amount of energy, both for lighting the LEDs and for removing the heat generated by the LEDs.

As an example, if a large data center contains 1000 racks holding 20 servers 200 in each rack, and each server has about 20 LEDs 202, then the data center may contain over 400,000 LEDs 202. If each LED 202 consumes about 66 mW, and assuming a duty cycle of about 66%, the total power consumption from the LEDs 202 may be about 17 kW. Depending on the types of electronic components present in the data center, this may represent as much as 0.5-1% of the total power draw of the data center.

In an exemplary embodiment of the present invention, status LEDs may be disabled when not needed. The front panel of a electronic component, such as the server 200, may use a single LED 206 to indicate that the electronic component is operational. Other status LEDs 202 may be disabled to conserve power. The front panel may also have a button 208, such as a locate button, to locally enable the status LEDs 202, allowing a service engineer to examine the status of the electronic component. It should also be noted that status LEDs 202 may be located in other positions besides the front panel. Indeed, electronic components may have status LEDs 202 on the front panel, a rear panel, and on circuit boards inside the electronic component. The operation of all of the status LEDs 202 may be controlled as described herein. In addition, enabling the status LEDs 202 for operation does not necessarily mean that they are turned on, merely that the driver circuitry may turn on the LEDs 202 when appropriate to indicate the status of the associated electronic component.

In addition to lowering power requirements, enabling status LEDs only under certain conditions may make servicing electronic components in the data center easier. Specifically, the large numbers of servers 200, and other electronic components, that may be present in a data center may complicate the identification of a electronic component, or rack of electronic components, that needs servicing. However, if the status LEDs on most electronic components in the data center are dark, then any electronic component with enabled status LEDs will generally be easier to find. Accordingly, the status LEDs on individual electronic components in the data center may be enabled upon the detection of a fault in that electronic component or in associated electronic components, such as a failed network connection or a halted processor. Thus, the enabled status LEDs may indicate the location for the electronic component or electronic components needing attention. Further, the status LEDs may be disabled at scheduled times, for example, after normal business hours or at other times when personnel are not expected to be in the data center.

Disabling of the status LEDs in electronic components may also be advantageous in other application environments. For example, a small switch or router that allows for disabling of the status LEDs may be of significant value in a household environment, in which the continuously enabled LEDs may be a distraction.

Figure 3:
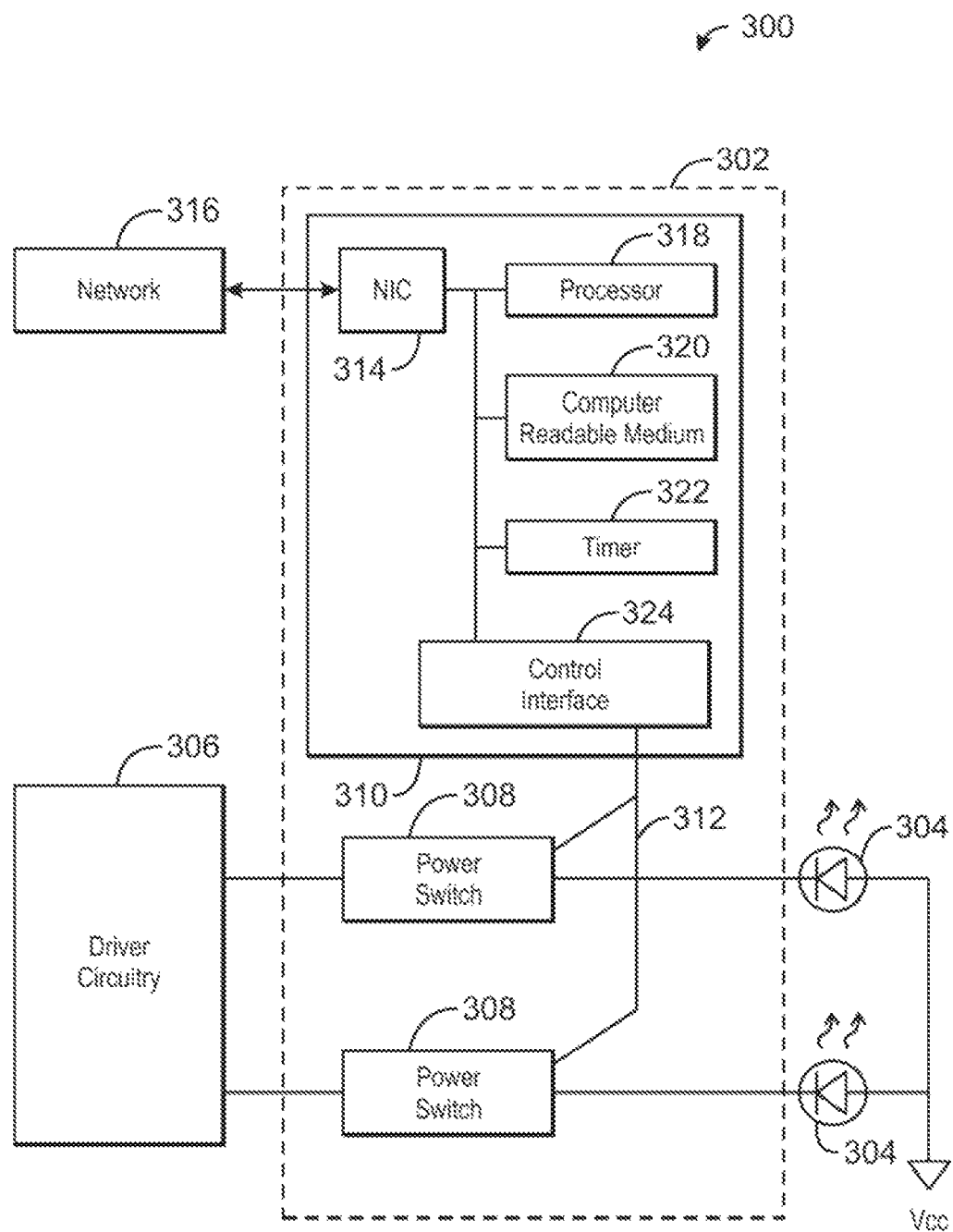
FIG. 3 is a schematic diagram of a electronic component that includes control circuits for disabling status light emitting diodes (LEDs), in accordance with an embodiment of the present invention.

FIG. 3 is a schematic diagram of an electronic component 300 that includes control circuits 302 for disabling status LEDs 304, in accordance with an embodiment of the present invention. Typically, all of the different types of electronic components described herein, including servers, switches, drives, drive arrays, or routers, will include status LEDs 304 and, thus, will have driver circuitry 306 to power the LEDs 304. In an embodiment of the present invention, the design of the electronic component 300 may be modified to insert control circuits 302 between the LEDs 304 and the driver circuitry 306 to disable the status LEDs 304. The control circuits 302 may generally include power switches 308 that are operated by control circuitry 310 through a power line 312.

The power switches 308 may include complementary metal oxide semiconductor field-effect transistors (CMOS FETs) or any other appropriate type of switch. Alternatively, the power switches 308 may comprise micro-relays, that are, for example, only energized to enable the status LEDs 304. The choice of the switching circuit to be used as the power switch 308 may be made on the basis of the cost of the additional circuitry and the power requirements of the power switches 308. Generally, the low power demand of CMOS FETs may provide an advantage in this application.

The control circuitry 310 may include any number of circuits to facilitate the control, such as a network interface 314 to accept commands to enable or disable the status LEDs 304 over a network 316. A processor 318 may be used to interpret and implement the commands. The control circuitry 310 may also include a tangible, computer-readable medium 320, including, for example, a RAM, a ROM, a drive, a drive array, a flash drive, any other type of hardware data recording device configured to enable the processor to store and operate programs that implement exemplary embodiments of the present invention, or any combinations thereof. A timer 322 or other clock circuit may be included for implementing time-out periods and to allow the processor 318 to enable or disable the status LEDs at preselected times. Finally, a control interface 324 may be included to drive the switches 308 through the power line 312. These functions may be implemented in a single application specific integrated circuit (ASIC) or may be implemented in separate circuits. In other exemplary embodiments of the present invention, the status LEDs 304 may be enabled or disabled by modifying existing circuitry in the electronic components.

Figure 4:
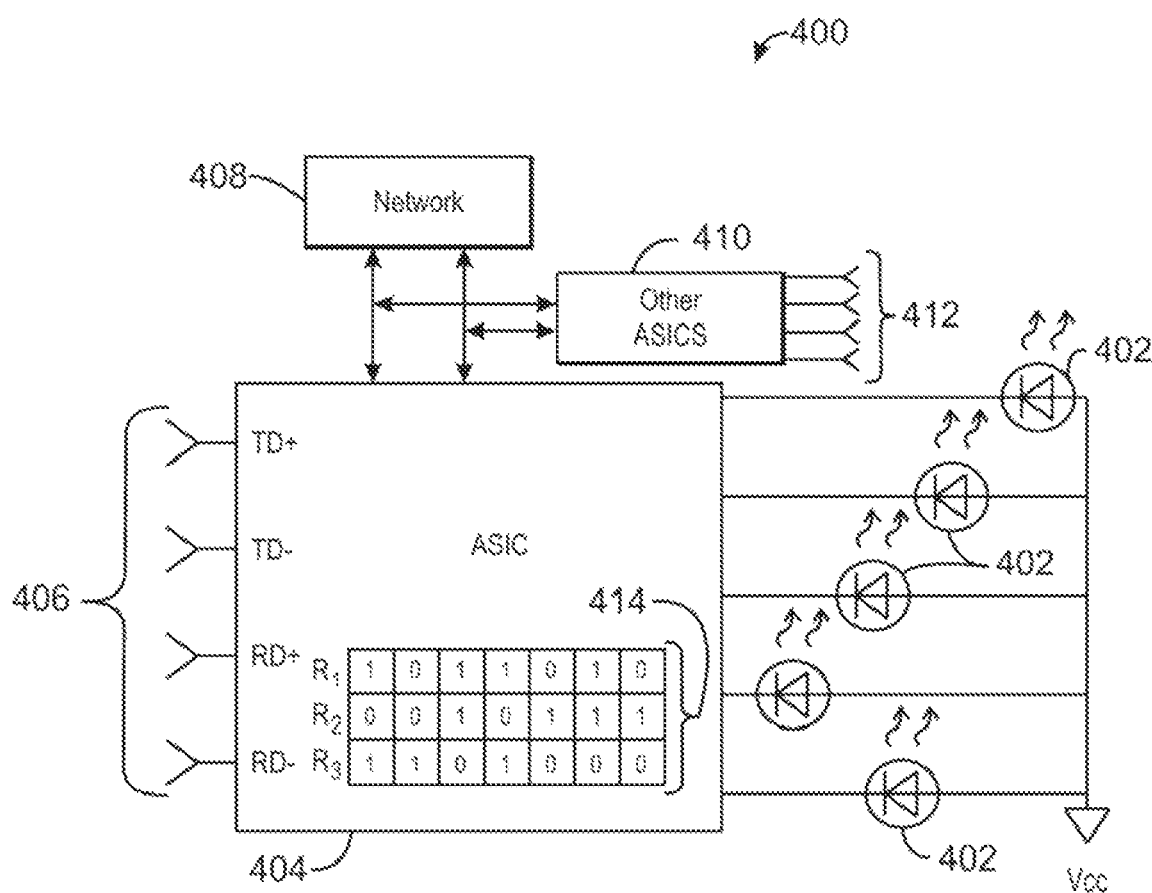
FIG. 4 is a schematic diagram of another electronic component that includes control circuitry that may be used to disable status indicators, in accordance with an embodiment of the present invention.

FIG. 4 is a schematic diagram of another electronic component 400 that includes control circuitry that may be used to disable status LEDs 402, in accordance with an exemplary embodiment of the present invention. The electronic component 400, for example, may comprise a router or switch, which may use an application specific integrated circuit (ASIC) 404 to couple a port 406 to a network 408. The electronic component 400 may also have other ASICs 410, for example, to couple additional ports 412 to the network 408. The ASIC 404 may incorporate driver circuitry to power the status LEDs 402. Further, the ASIC 404 may be programmable. In one example, the ASIC 404 may incorporate a tangible, computer readable medium for storing and operating programs or may access an external medium. The ASIC 404 may be programmed to allow the status LEDs 402 to be disabled. Disabling the LEDs may be performed, for example, by writing to registers 414 in the ASIC that control the activation of the LEDs 402. Generally, such registers may be useful for determining which parameters are indicated by the status LEDs 402. However, if the ASIC 404 is not programmable, additional control circuits, as discussed with respect to FIG. 3, may be used.

Figure 5:
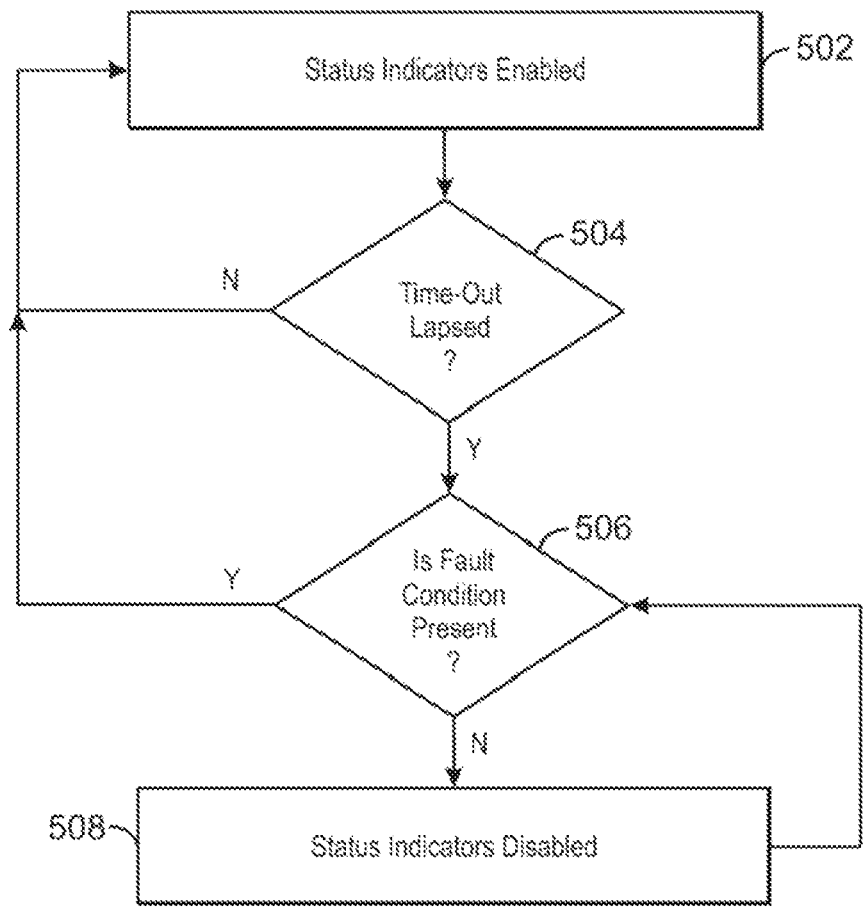
FIG. 5 is a process flow diagram of a method for temporarily disabling status indicators, in accordance with an embodiment of the present invention.

FIG. 5 is a process flow diagram of a method 500 for temporarily disabling status indicators, in accordance with an exemplary embodiment of the present invention. As shown in FIG. 5, the method 500 begins at block 502 with all of the status indicators enabled. For example, all of the status indicators may be enabled when an electronic component has been powered on. A fixed or programmable value may be set for a countdown timer (e.g., a time-out period) to keep the status indicators powered for some period of time after startup. In some exemplary embodiments the time-out period may be set to zero. In block 504, a determination is made regarding whether the time-out period has elapsed. If not, process flow returns to block 502, and the status indicators remain enabled. If the time-out period has elapsed, the process flow proceeds to block 506, where a determination is made regarding whether a fault condition is present. Whether a fault condition exists may be determined, for example, by a supervisory or managerial system connected to the LED control by the network. Alternatively, a local control system may determine if a fault condition is present, for example, if communications over the network have stopped unexpectedly. If a fault condition is present, the time-out period may be reset and returns to block 502, where the status indicators are enabled.

If the time-out period has lapsed and no fault conditions are present, in block 508 the status indicators are disabled. After the status indicators are disabled, the method 500 returns to block 506 to determine whether a fault has occurred. If a fault is present, the time-out period is reset, and process flow continues at block 502, where the status indicators are enabled. Those of ordinary skill in the art will appreciate that the method 500 is only one of numerous ways of temporarily disabling the status indicators in accordance with an exemplary embodiment of the present invention based on the disclosure contained herein.

Figure 6:
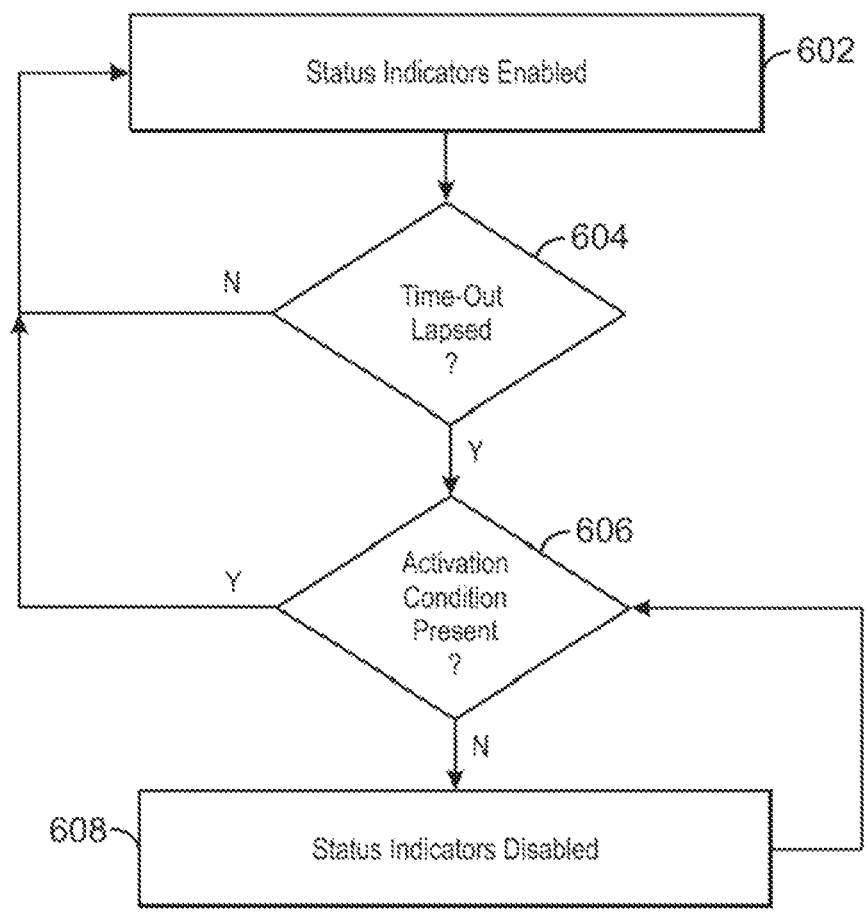
FIG. 6 is a process flow diagram of another method for temporarily disabling status indicators, in accordance with an embodiment of the present invention.

FIG. 6 is a process flow diagram of another method 600 for temporarily disabling status indicators, in accordance with an exemplary embodiment of the present invention. The method 600 begins at block 602 with all status indicators enabled on an electronic component. As discussed with respect to FIG. 5, this may occur when an electronic component is turned on. A time-out period is set and process flow continues to block 604, where a determination is made regarding whether the time-out period has elapsed. If not, process flow proceeds to block 602, where the status indicators are enabled. In some exemplary embodiments the time-out period may be set to zero.

If, at block 604, the time-out period has elapsed, process flow proceeds to block 606 where a determination is made regarding whether an activation condition is present. The activation condition may comprise the setting of a bit in a register set by a managerial system, for example, on a scheduled basis. Such a bit may be set upon occurrence of a fault, or upon a manual command entered by a user. Further, the activation condition may be set by pressing a button on the front of the electronic component, such as a locate button. If the activation condition is present, process flow proceeds to block 602, where the status indicators are enabled.

If, at block 606, the activation condition is determined not to be present (for example, if the locator button has not been pressed or the managerial system has not set the bit value), process flow proceeds to block 608, where the status indicators are disabled. After block 608, process flow continues to block 606, where a determination is again made regarding whether the activation condition has occurred. If an activation condition is present, process flow continues to block 602 and the status indicators are enabled. Those of ordinary skill in the art will appreciate that the methods described with respect to FIGS. 5 and 6, may be combined into a single method.

Figure 7:
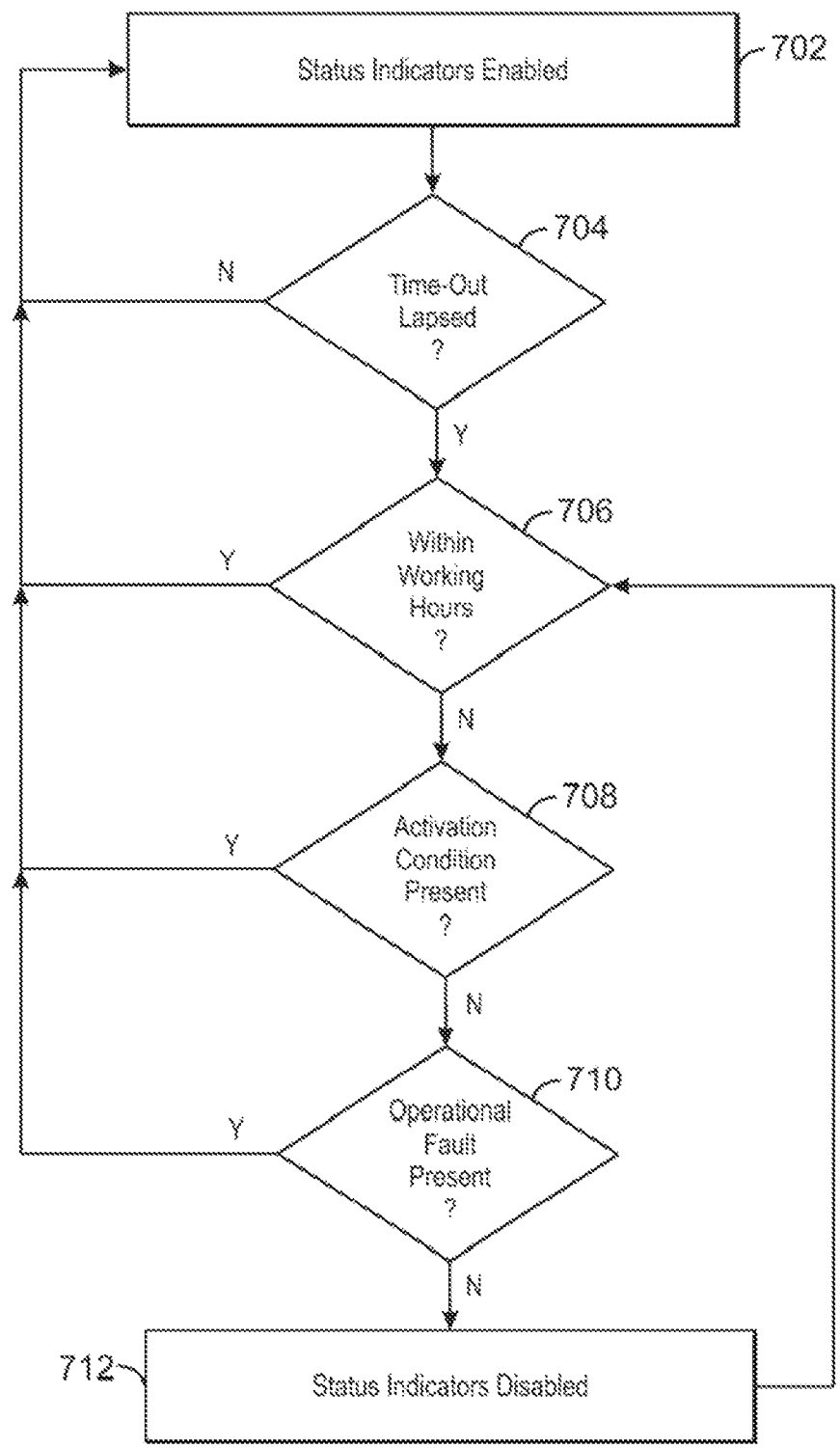
FIG. 7 is a process flow diagram of a method for temporarily disabling a status LED, in accordance with an embodiment of the present invention.

FIG. 7 is a process flow diagram of a method 700 for temporarily disabling status indicators, in accordance with an exemplary embodiment of the present invention. The method 700 begins at block 702 with the status indicators enabled. A time-out period may be set to an initial value. In some exemplary embodiments the time-out period may be set to zero. At block 704, a determination is made regarding whether the time-out period has elapsed. If not, the process flow returns to block 702, and the status indicators remain enabled. If, at block 704, the time-out period has elapsed, process flow proceeds to block 706. At block 706, a determination is made regarding whether the current time is within a preset operational window, which may be defined to correspond with working hours of the data center. If the current time is within the preset operational window, the time-out period is reset to the initial value, and process flow continues at block 702, where the status indicators are left enabled. If the current time is not within the preset operational window, process flow proceeds to block 708.

At block 708, a determination is made regarding whether an activation condition is present, as described with respect to block 606 of FIG. 6. If, at block 708, an activation condition is present, the time-out period is reset to the initial value, and process flow proceeds to block 702, where the status indicators are enabled. If, at block 708, the activation condition is not present, process flow continues to block 710, where a determination is made regarding whether an operational fault is present. As noted previously, the presence of an operational fault may be determined by a managerial system on the network or may be determined locally by a networked electronic component. If an operational fault is present, the time-out period is reset to the initial value, and the process flow returns to block 702, where the status indicators are again enabled. If, at block 710, an operational fault is not present, process flow continues to block 712.

At block 712, the status indicators are disabled, allowing the electronic component to go dark. In one exemplary embodiment, all status indicators are disabled except for an operational indication, such as a power LED. From block 712, process flow may proceed to block 706, with blocks 706-710 being repeated in a loop fashion, as described above.

The control blocks in the methods 500, 600, and 700, discussed with respect to FIGS. 5-7 may take the form of software modules stored on the tangible, computer-readable medium. Alternatively, the control blocks may be hardware devices, or a combination of hardware and software.

What is claimed is:

1. A method of lowering power consumption, comprising: temporarily disabling a power switch associated with each of a plurality of status indicators on a plurality of electronic components without disabling the operation of the electronic components, wherein the status indicators are disabled upon the resolution of a fault in the electronic component.

2. The method of claim 1, comprising leaving at least one of the plurality of status indicators active to indicate the operational status of the electronic component.

3. The method of claim 1, wherein the status indicators are disabled after a time-out period has elapsed.

4. The method of claim 1, comprising enabling the status indicators upon the detection of a fault in the electronic component, upon receiving an enable command over a network, upon the activation of a button on the electronic component, or any combinations thereof.

5. The method of claim 4, wherein enabling the status indicators allows the status indicators to be turned-on by a driver in response to a status condition.

6. The method of claim 1, comprising disabling and enabling the status indicators on a fixed time schedule.

7. The method of claim 1, wherein the electronic components comprise a data center.

8. The method of claim 1, comprising sending a command to an application specific integrated circuit to deactivate a status light.

9. An electronic device, comprising:
a plurality of status indicators built into the electronic device; and
a plurality of switches operatively coupled to the plurality of status indicators, wherein activation of each of the switches enables an associated status indicator;
wherein the status indicators are disabled upon the resolution of a fault in the electronic component.

10. The electronic device of claim 9, comprising a computer, a server, a drive, a drive array, a switch, a router, or a power supply, or any combinations thereof.

11. The electronic device of claim 9, comprising a module configured to control the switches on a time schedule, a module configured to deactivate the switches after a time-out period, a module to activate the switches upon detection of a fault condition, or any combinations thereof.

12. The electronic device of claim 9, wherein the status indicators comprise light emitting diodes (LEDs), liquid crystal displays (LCDs), LCD displays, incandescent lights, neon lights, or any combinations thereof.

13. The electronic device of claim 9, comprising an application specific integrated circuit operatively coupled between a driver circuit and an indicator light.

14. A non-transitory, computer-readable medium, comprising:
code configured to disable status indicators built into an electronic component by deactivating a switch associated with each status indicator without disabling the electronic component, wherein the status indicators are disabled upon the resolution of a fault in the electronic component.

15. The non-transitory, computer-readable medium of claim 14, wherein the code configured to disable the status indicators comprises a time-out timer.

16. The non-transitory, computer-readable medium of claim 14, comprising code configured to reactivate the status indicators upon detection of a network fault.

17. The non-transitory, computer-readable medium of claim 14, comprising a register block in an application specific integrated circuit.

\* \* \* \* \*